United States Patent Office 3,501,450
Patented Mar. 17, 1970

3,501,450
PROCESS FOR POLYMERIZATING ETHYLENE WITH A CATALYST CONSISTING OF AN ORGANOTIN HYDRIDE, A TRANSITION METAL COMPOUND AND AN ORGANOTIN PHENOXIDE
Kazuo Itoi, Kurashiki Japan, assignor to Kurashiki Rayon Co., Ltd., Kurashiki, Japan
No Drawing. Filed July 8, 1965, Ser. No. 470,603
Claims priority, application Japan, July 14, 1964, 39/39,107
Int. Cl. C08f 1/42, 3/04
U.S. Cl. 260—94.9                                      6 Claims

ABSTRACT OF THE DISCLOSURE

High molecular weight polyethylene is produced in high yields by polymerizing ethylene in the presence of a three-component catalyst consisting of an organotin hydride, a transition metal compound and an organotin phenoxide.

---

This invention relates to an improved process for the preparation of polyethylene. More particularly the present invention relates to a process for preparing, at a high yield, high molecular weight polyethylene by the aid of a novel catalyst component.

The present invention, accordingly, provides a novel polymerization process of ethylene.

It is another object of the invention to provide a process for the preparation of ethylene by the use of a three-component catalyst which comprises an organotin hydride containing in its molecule at least one Sn—H linkage, a compound of a transition metal of group IVa, Va or VIa of the Periodic Table and an organotin phenoxide containing in its molecule at least one phenoxide linkage.

It is a further object of the invention to provide an inexpensive process for the preparation of polyethylene in which the catalyst and solvent are used in the amount of less than one-fifth of the amount as used in the two-component catalyst process.

The inventor has made many investigations upon the polymerization of ethylene using catalysts which consist of combinations of organotin hydride with transition metals, and have found that the activity of the catalyst is remarkably enhanced by adding thereto, as a third component, organotin phenoxides formed by the combination of phenols with tin compounds.

An advantage of the process of the invention is that, as the activity of the catalyst is so remarkably enchanced, the yield of polyethylene reaches more than five times that attainable by the use of a two-component catalyst of the organotin hydride and transition metal compound in the same amount.

Accordingly, in the case of the catalyst of the invention the amount of the catalyst and solvent required for the preparation of a certain quantity of polyethylene is less than one-fifth of the amount required in the process using the two-component catalysts, so that the process of the invention is considerably advantageous for the production of polyethylene in commercial scale.

Another advantage of the process of the invention is that, due to the remarkably high activity of the catalyst, impurities in the liquid polymerization medium, if present in a small amount, have less influences than in the process with two-components catalyst of an organotin hydride and a transition metal compound. Consequently, in the process of the invention polymerization proceeds with a good reproducibility, and the expense for the purification of the solvent can be reduced.

The organotin phenoxide suitable for use in the process of the invention is a compound having at least one ≡Sn—O—R° linkage, where R° represents aromatic nucleus. It is a compound having the general formula selected from the group consisting of

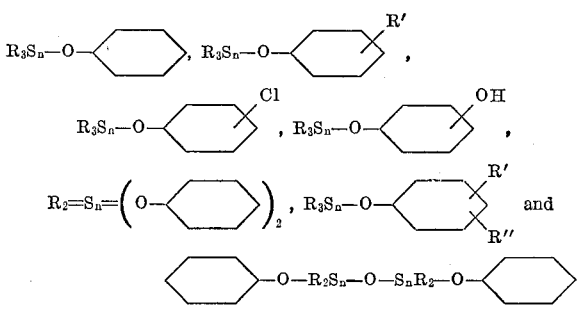

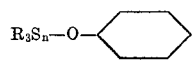

The compounds having the general formula

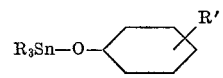

are trimethyltin phenoxide, triethyltin phenoxide, tri-n-propyltin phenoxide, tri-i-propyltin phenoxide, tri-n-butyltin phenoxide, and triphenyltin phenoxide, tribenzyltin phenoxide.

The compounds having the general formula $$R_3Sn-O-\underset{R'}{\bigcirc}$$

are:

trimethyltin-o-methylphenoxide, trimethyltin-m-methylphenoxide,
trimethyltin-p-methylphenoxide,
trimethyltin-o-ethylphenoxide,
trimethyltin-m-ethylphenoxide,
trimethyltin-p-ethylphenoxide, trimethyltin-o-n-propylphenoxide,
trimethyltin-m-n-propylphenoxide,
trimethyl-p-n-propylphenoxide,
trimethyltin-o-i-propylphenoxide,
trimethyltin-m-i-propylphenoxide, trimethyltin-p-i-propylphenoxide,
triethyltin-o-methylphenoxide,
triethyltin-m-methylphenoxide,
triethyltin-p-methylphenoxide,
triethyltin-o-ethylphenoxide,
triethyltin-m-ethylphenoxide,
triethyltin-p-ethylphenoxide, triethyltin-o-n-propylphenoxide,
triethyltin-m-n-propylphenoxide,
triethyltin-p-n-propylphenoxide,
triethyltin-o-i-propylphenoxide,
triethyltin-m-i-propylphenoxide, triethyltin-p-i-propylphenoxide,
tri-n-propyltin-o-methylphenoxide,
tri-n-propyltin-m-methylphenoxide, tri-n-propyltin-p-methylphenoxide,
tri-n-propyltin-o-ethylphenoxide,
tri-n-propyltin-m-ethylphenoxide,
tri-n-propyltin-p-ethylphenoxide,
tri-n-propyltin-o-n-propylphenoxide,
tri-n-propyltin-m-n-propylphenoxide,
tri-n-propyltin-p-n-propylphenoxide,
tri-n-propyltin-o-i-propylphenoxide,
tri-n-propyltin-m-i-propylphenoxide, tri-n-propyltin-p-i-propylphenoxide,
tri-i-propyltin-o-methylphenoxide,
tri-i-propyltin-m-methylphenoxide, tri-i-propyltin-p-methylphenoxide,
tri-i-propyltin-o-ethylphenoxide, tri-i-propyltin-m-ethylphenoxide, tri-i-propyltin-p-ethylphenoxide,
tri-i-propyltin-o-n-propylphenoxide,
tri-i-propyltin-m-n-propylphenoxide, tri-i-propyltin-p-n-propylphenoxide,
tri-i-propyltin-o-i-propylphenoxide,
tri-i-propyltin-m-i-propylphenoxide,
tri-i-propyltin-p-i-propylphenoxide,
tri-n-butyltin-o-methylphenoxide,
tri-n-butyltin-m-methylphenoxide,
tri-n-butyltin-p-methylphenoxide,
tri-n-butyltin-o-ethylphenoxide,
tri-n-butyltin-m-ethylphenoxide,
tri-n-butyltin-p-ethylphenoxide, tri-n-butyltin-o-n-propylphenoxide,
tri-n-butyltin-m-n-propylphenoxide,
tri-n-butyltin-p-n-propylphenoxide, tri-n-butyltin-o-i-propylphenoxide,
tri-n-butyltin-m-i-propylphenoxide,
tri-n-butyltin-p-i-propylphenoxide, triphenyltin-o-methylphenoxide,
triphenyltin-m-methylphenoxide,
triphenyltin-p-methylphenoxide,
triphenyltin-o-ethylphenoxide,
triphenyltin-m-ethylphenoxide,
triphenyltin-p-ethylphenoxide,
triphenyltin-o-n-propylphenoxide, triphenyltin-m-n-propylphenoxide,
triphenyltin-p-n-propylphenoxide,
triphenyltin-o-i-propylphenoxide,
triphenyltin-m-i-propylphenoxide,
triphenyltin-p-i-propylphenoxide, tribenzyltin-o-methylphenoxide,
tribenzyltin-m-methylphenoxide and
tribenzyltin-p-methylphenoxide.

The compounds having a general formula

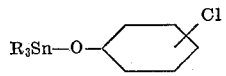

are trimethyltin-o-chlorophenoxide, trimethyltin-m-chlorophenoxide and trimethyltin-p-chlorophenoxide.

The compounds having the general formula

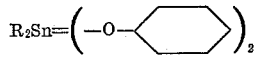

are dimethyltin-diphenoxide, diethyltin-diphenoxide and di-n-butyltin-diphenoxide.

The compounds having the general formula

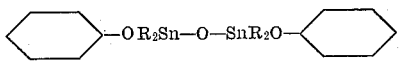

are bis(dimethyltin phenoxy)oxide, bis(diethyltin phenoxy)oxide, bis(di-n-butyltin phenoxy)oxide.

Although halides, oxyhalides, alkoxides, acetylacetonates and like compounds of transition metals of groups IVa, Va and VIa of the Periodic Table may be used as the transition metal compound, the chlorides and oxychlorides are preferred.

Though the preferred ratio of the organotin phenoxide varies according to the kinds of the organotin phenoxide employed, the phenoxide may be used in the molar ratio to the transition metal compound of from 0.01 to 1. Of course, the phenoxide may be used in the molar ratio of less than 0.01. However, it is ineffective when used in such a small ratio. On the other hand, when the phenoxide is used in the molar ratio above 1, the activity of the catalyst is rather decreased. The molar ratio of the tin hydride to the transition metal compound may be in the range between 0.1 and 100, preferably in the range between 0.5 and 5.

The catalyst system of the invention is conveniently prepared by adding the three-components to an inert solvent, such as saturated hydrocarbons, aromatic hydrocarbons or halogenated hydrocarbons, in the stream of gaseous ethylene. The order of adding the three components has no appreciable influence on the activity of the resulting catalyst system.

The polymerization of ethylene in the process of the invention is conducted preferably in the presence of an inert solvent as mentioned above. The polymerization of course can be conducted under pressure.

The polymerization may be conducted at a temperature within the range of −30° C. to 150° C., but preferably in the range between −10° C. and 80° C. After completion of the polymerization, the polyethylene thus prepared may be subjected to any of the conventional post treatments such as, e.g., decomposition of catalyst with water or alcohol and purification.

The invention will now be illustrated by the following examples, but is not limited by the examples.

EXAMPLE 1

A four-necked round-bottom flask of a capacity of 500 cc. was equipped with a stirrer, a thermometer, a reflux condenser and inlet and outlet for ethylene, and was then purged by passing therethough ethylene with stirring. When air in the flask had been purged out, the flask was then charged with 300 cc. of n-hexane and, after additional 15 minutes of blowing-in of ethylene, charged thereinto at 30° C. 0.75 cc. of tributyltin hydride, 0.1 cc. tri-n-butyltin phenoxide and 0.3 cc. of titanium tetrachloride. Then brown-colored precipitate was formed and polymerization of ethylene took place immediately. The content of the flask was maintained at 30° C. by externally cooling the flask to eliminate heat generated by polymerization of ethylene. After 30 minutes, the blowing-in of ethylene was stopped and methanol was added to the flask, then content of the flask became white. The content of the flask was filtered, washed with methanol and, after boiled for 5 hours in 300 cc. of methanol containing 20% by volume of a 35% aqueous hydrochloric acid, then filtered again, washed with methanol three times and dried at 60° C. under a reduced pressure for 24 hours. Thus, 21.6 g. of white polyethylene were obtained. The molecular weight of the polyethylene thus formed was 39,000 as calculated from the intrinsic viscosity in tetralin at 130° C. The yield of polyethylene was 9.8 g. when the polymerization was carried out under the same conditions except that tributylphenoxide was not added.

EXAMPLE 2

The procedure same as in Example 1 was repeated using n-hexane of a lower degree of purification. In this example, polymerization was conducted until the catalyst used lost catalytic activity. The results are summarized in the following table. As indicated in the table, by addition of tributyltin phenoxide the yield of polyethylene was increased to about 5–6 times the yield that was obtained by the use of two-component catalysts.

| Tributyltin phenoxide (cc.) | Polymerization time (hr.) | Polyethylene formed | |
|---|---|---|---|
| | | Yield (g.) | Molecular weight (×10³) |
| 0 | 1.0 | 3.3 | 67 |
| 0.05 | 1.5 | 15.8 | 67 |
| 0.1 | 1.0 | 18.0 | 68 |
| 0.2 | 1.0 | 16.3 | 77 |
| 0.3 | 1.0 | 11.1 | 77 |

EXAMPLE 3

In the manner similar to Example 1, triethyltin-p-methlphenoxide was used in place of tributyltin phenoxide. 20.5 g. of polyethylene with a molecular weight of 62,000 were obtained.

EXAMPLE 4

An autoclave provided with an agitator was purged with ethylene and then charged with 200 cc. of n-hexane, 0.2 cc. of vanadyl trichloride, 0.1 cc. of tributyltin phenoxide and 2 cc. of tributyltin hydride. To the autoclave was introduced ethylene, then immediately polymerization of ethylene took place and the temperature in the autoclave rose to 80° C. After 1 hour, introduction of ethylene was stopped, and the autoclave was opened and the content of the autoclave was treated in the same manner as in Example 1. Thus, 35 g. of a purified polyethylene with a molecular weight of 230,000 were obtained.

EXAMPLE 5

By using 0.2 cc. of chromium trichloride in place of vanadyl trichloride in the same manner as in Example 4, 38 g. of polyethylene with a molecular weight of 140,000 were obtained.

What I claim is:

1. In a process for producing high molecular weight polyethylene by polymerizing ethylene in the presence of a multi component catalyst containing (1) an organotin hydride having at least one Sn—H linkage and (2) a compound of a transition metal selected from the group consisting of metals of groups IVa, Va, and VIa of the Periodic Table, wherein the improvement comprises carrying out the polymerization in the presence of the aforementioned catalyst components (1) and (2) together with a third catalyst component consisting of (3) an organotin phenoxide selected from the group consisting of trimethyltin - o - chlorophenoxide, trimethyltin - m-chlorophenoxide, trimethyltin - p - chlorophenoxide, dimethyltin - diphenoxide, diethyltin - diphenoxide, di - n-butyltin - diphenoxide, bis(dimethyltin phenoxy)oxide, bis(diethyltin phenoxy)oxide, bis(di-n-butyltin phenoxy)-oxide,

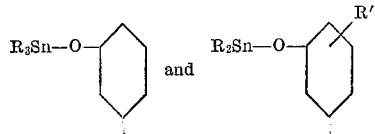

and wherein each R is a member of the group consisting of methyl, ethyl, propyl, butyl, phenyl and benzyl, and wherein R' is a member of the group consisting of methyl, ethyl and propyl, the molar ratio of said component (1) to said component (2) being in the range of 0.1:1 to 100:1 and the molar ratio of said component (3) to said component (2) being in the range of 0.01:1 to 1:1.

2. In a process according to claim 1, wherein the organotin hydride is a trialkyl tin hydride.

3. In a process according to claim 2, wherein the trialkyl tin hydride is tributyl tin hydride.

4. In a process according to claim 2, wherein the organotin phenoxide is selected from the group consisting of triethyl tin - p - methyl phenoxide and tributyl tin phenoxide.

5. In a process according to claim 2, wherein the molar ratio of said trialkyl tin hydride to said transition metal compounds is in the range of 0.5:1 to 5:1, and wherein the polymerization is carried out at a temperature of −10° C. to 80° C.

6. In a process according to claim 5, wherein the catalyst components are (1) tri-n-butyltin hydride, (2) titanium tetrachloride and (3) tri-n-butyltin phenoxide.

References Cited

UNITED STATES PATENTS 3,163,629  12/1964  Li _____ 260—94.9
3,225,022  12/1965  Andersen et al. _____ 260—94.9
3,355,443  11/1967  Itoi _____ 260—94.9

JOSEPH L. SCHOFER, Primary Examiner

E. J. SMITH, Assistant Examiner

U.S. Cl. X.R.

252—429

UNITED STATES PATENT OFFICE
CERTIFICATE OF CORRECTION

Patent No. 3,501,450   March 17, 1970

Kazuo Itoi

It is certified that error appears in the above identified patent and that said Letters Patent are hereby corrected as shown below:

Column 5, line 35, in the second structural formula, "$R_2Sn$" should read -- $R_3Sn$ --.

Signed and sealed this 23rd day of February 1971.

(SEAL)
Attest:

Edward M. Fletcher, Jr.  WILLIAM E. SCHUYLER, JR.
Attesting Officer  Commissioner of Patents